United States Patent
Simone et al.

(10) Patent No.: US 11,677,616 B2
(45) Date of Patent: Jun. 13, 2023

(54) SYSTEM AND METHOD FOR PROVIDING A NODE REPLACEMENT CONTROLLER FOR USE WITH A SOFTWARE APPLICATION CONTAINER ORCHESTRATION SYSTEM

(71) Applicant: ORACLE INTERNATIONAL CORPORATION, Redwood Shores, CA (US)

(72) Inventors: Daniel Simone, Newtown, PA (US); Jeffrey Berkowitz, Cornelius, OR (US); Eric Rath, Portland, OR (US); Aaron Tam, Tualatin, OR (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/390,691

(22) Filed: Jul. 30, 2021

(65) Prior Publication Data
US 2023/0036657 A1 Feb. 2, 2023

(51) Int. Cl.
G06F 15/173 (2006.01)
H04L 41/0654 (2022.01)
H04L 67/561 (2022.01)
G06F 9/455 (2018.01)

(52) U.S. Cl.
CPC ........ H04L 41/0654 (2013.01); H04L 67/561 (2022.05); *G06F 9/45541* (2013.01)

(58) Field of Classification Search
CPC ............ H04L 41/0654; H04L 67/2804; H04L 67/561; G06F 9/45541

USPC .................................................. 709/223–224
See application file for complete search history.

(56) References Cited

U.S. PATENT DOCUMENTS

| | | | |
|---|---|---|---|
| 2020/0034258 A1* | 1/2020 | Avraham | G06F 11/2097 |
| 2021/0157622 A1* | 5/2021 | Ananthapur Bache | H04L 41/0895 |
| 2021/0271521 A1* | 9/2021 | Kang | H04L 41/082 |
| 2022/0035626 A1* | 2/2022 | Kapoor | H04L 67/10 |
| 2022/0261277 A1* | 8/2022 | Anand | G06F 9/4881 |

OTHER PUBLICATIONS

Kubernetes, "Kubernetes API Concepts"; retrieved from <https://kubernetes.io/docs/reference/using-api/api-concepts/> on Jan. 6, 2023; 17 pages.

(Continued)

*Primary Examiner* — Bharat Barot
(74) *Attorney, Agent, or Firm* — Tucker Ellis LLP

(57) ABSTRACT

In accordance with an embodiment, described herein is a system and method use of a controller with a software application container orchestration system, which is adapted to provide safe and efficient replacement of nodes in a containerized environment. A node replacement controller drives the process of node replacement, and indirectly and asynchronously interacts, through metadata, with an implementation-specific node processor, and application-specific health controller, to discover nodes that should be processed, determine when the application workload is in a stable state, declare those nodes as ready to be processed, and determine when those nodes have finished processing. The node replacement controller can be implemented once for a given type of container orchestration system, and then applied to other container orchestration implementations (vendors) and workload types using that container orchestration system.

15 Claims, 16 Drawing Sheets

(56) References Cited

OTHER PUBLICATIONS

Kubernetes, "Custom Resources"; retrieved from <https://kubernetes.io/docs/concepts/extend-kubernetes/api-extension/custom-resources/> on Jan. 6, 2023; 7 pages.
Kubernetes, "Horizontal Pod Autoscaling"; retrieved from <https://kubernetes.io/docs/tasks/run-application/horizontal-pod-autoscale/> on Jan. 6, 2023; 9 pages.
Fansong, "How Does Alibaba Ensure the Performance of System Components in a 10,000-node Kubernetes Cluster", Nov. 12, 2019; retrieved from <https://alibaba-cloud.medium.com/how-does-alibaba-ensure-the-performance-of-system-components-in-a-10-000-node-kubernetes-cluster-ff0786cade32> on Jan. 6, 2023; 16 pages.
Singh, "How We Operate Kubernetes Multitenant Clusters in Public Cloud at Scale", Oct. 30, 2020; retrieved from <https://medium.com/salesforce-engineering/how-we-operate-kubernetes-multitenant-clusters-in-public-cloud-at-scale-548d9ca48d36> on Jan. 6, 2023; 2 pages.
Singh, "How Salesforce Operates Kubernetes Multitenant Clusters in Public Cloud at Scale", Oct. 30, 2020; retrieved from <https://vmblog.com/archive/2020/10/30/how-salesforce-operates-kubernetes-multitenant-clusters-in-public-cloud-at-scale.aspx#.Y7hjZBXMJaR> on Jan. 6, 2023; 4 pages.
Goyal, "Kubernetes Fundamentals", Aug. 17, 2020; retrieved from <https://medium.com/swlh/kubernetes-fundamentals-74f11b12f29c> on Jan. 6, 2023; 13 pages.

* cited by examiner

SYSTEM AND METHOD FOR PROVIDING A NODE REPLACEMENT CONTROLLER FOR USE WITH A SOFTWARE APPLICATION CONTAINER ORCHESTRATION SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing, and software application container orchestration, and are particularly directed to a system and method for providing safe and efficient replacement of nodes in a containerized environment.

BACKGROUND

When operating a container orchestration system that includes an application workload deployed to a set of nodes, a common requirement is the need to replace one or more of the nodes in a live production environment. This may be necessitated in a variety of scenarios, for example to uptake new base images, or to ensure that the production nodes are newer than some arbitrary date.

However, typical approaches to accomplish such replacement of production nodes are either slow to finish, or risk application downtime, depending on the application workload running within the container orchestration environment.

SUMMARY

In accordance with an embodiment, described herein is a system and method use of a controller with a software application container orchestration system, which is adapted to provide safe and efficient replacement of nodes in a containerized environment. A node replacement controller drives the process of node replacement, and indirectly and asynchronously interacts, through metadata, with an implementation-specific node processor, and application-specific health controller, to discover nodes that should be processed, determine when the application workload is in a stable state, declare those nodes as ready to be processed, and determine when those nodes have finished processing. The node replacement controller can be implemented once for a given type of container orchestration system, and then applied to other container orchestration implementations (vendors) and workload types using that container orchestration system.

DETAILED DESCRIPTION

Figure 1:
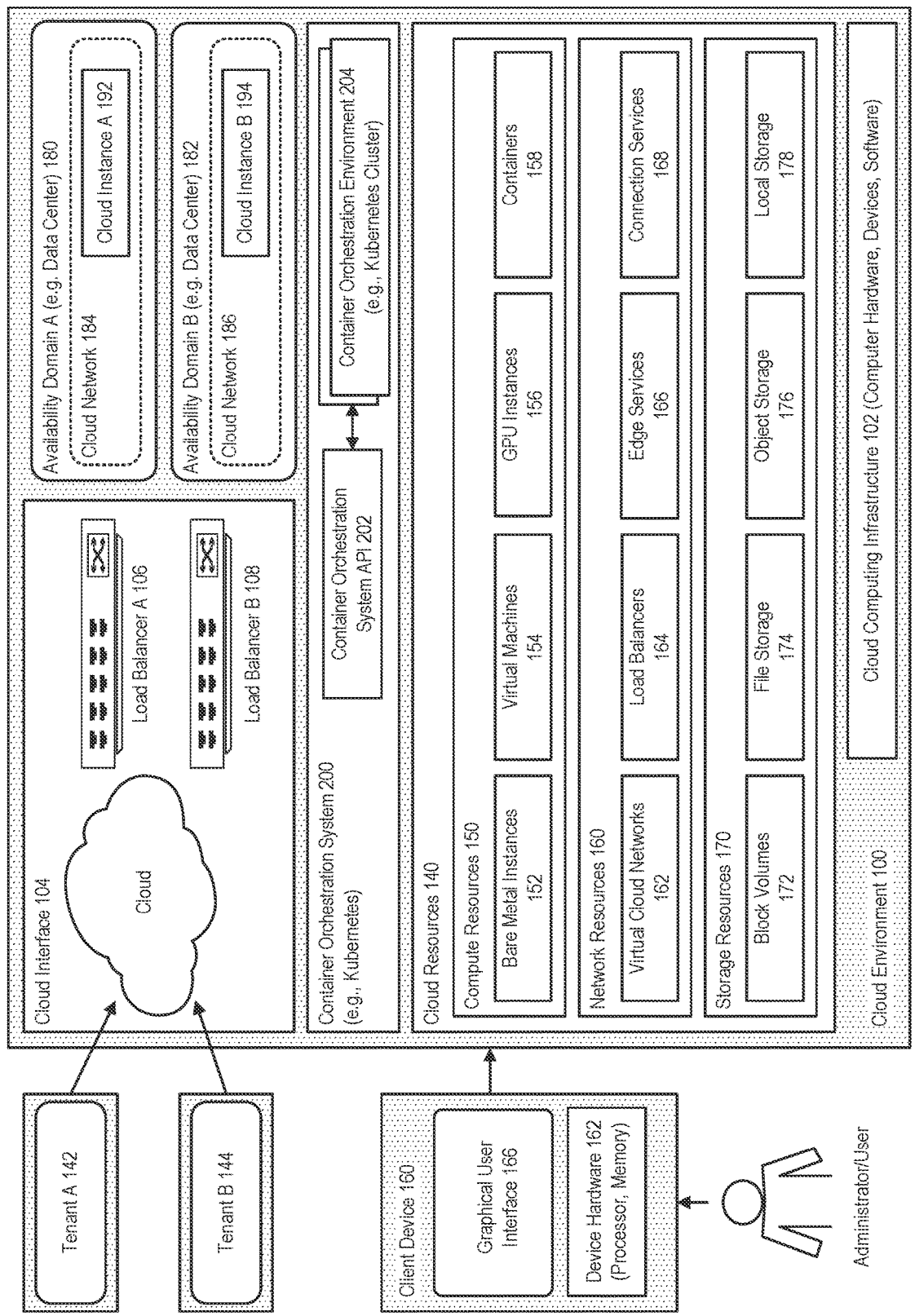
FIG. 1 illustrates an example cloud environment that includes a container orchestration system, in accordance with an embodiment.

As described above, in a container orchestration system that includes an application workload deployed to a set of nodes, typical approaches to accomplish a replacement of production nodes are either slow to finish, or risk application downtime, depending on the application workload running within the container orchestration environment.

In accordance with an embodiment, described herein is a system and method use of a controller with a software application container orchestration system, which is adapted to provide safe and efficient replacement of nodes in a containerized environment.

In accordance with an embodiment, various details of a particular implementation or embodiment are provided below. The description is provided for the purposes of illustration and description. It is not intended to be exhaustive or to limit the scope of protection to the precise forms disclosed. Many modifications and variations will be apparent to the practitioner skilled in the art.

In accordance with an embodiment, various components, processes, and features are described herein, including:

Container Orchestration System

In accordance with an embodiment, a container orchestration system provides a runtime for containerized workloads and services. Examples of container orchestration systems can include Kubernetes, and Docker Swarm.

Container Orchestration Environment

In accordance with an embodiment, a container orchestration environment (environment) is an instance of a container orchestration system. For example, a specific Kubernetes cluster, or a specific Docker Swarm instance, are examples of (respectively Kubernetes, or Docker Swarm) container orchestration environments.

Container Orchestration Implementation

In accordance with an embodiment, a container orchestration implementation (referred to herein in some embodiments as a container orchestration vendor, or vendor) is an implementation provider for a particular type of container orchestration system. Examples of container orchestration implementations include Oracle Container Engine for Kubernetes (OKE), and Amazon Elastic Kubernetes Service (EKS), both of which provide container orchestration implementations (i.e., are vendors) for Kubernetes.

Application Workload

In accordance with an embodiment, an application workload is a custom application that has been deployed within a container orchestration environment.

Controller

In accordance with an embodiment, a controller is a software component or a process of the container orchestration system that watches a container orchestration environment for events and state changes, and then performs some action as a result. The controller uses one or more application program interfaces (API) provided by the container orchestration system for both the event watching and to take any action within the container orchestration environment.

Metadata

In accordance with an embodiment, as referred to herein metadata is a lightweight configuration data that is stored in the container orchestration environment itself. Metadata can be retrieved and watched by a controller acting on the container orchestration environment. Supported container orchestration systems provide the ability to read and write the metadata associated with their container orchestration environments.

Node

In accordance with an embodiment, a node can be an individual bare metal machine or virtual machine (VM), to which containers are scheduled to run within a container orchestration environment, for example as part of a Kubernetes cluster or Docker Swarm instance.

Node Labels

In accordance with an embodiment, node labels are represented as key-value pairs that are associated with each node in the container orchestration environment. Supported container orchestration systems provide the ability to associate node labels with nodes, wherein such labels can indicate, for example: (a) one or more fault domain(s) in which the node is running; and (b) a date or time at which the node was created.

Fault Domain

In accordance with an embodiment, a fault domain is a group of nodes that share some physical infrastructure. For example, a particular node can be associated with one more fault domains, examples of which may include regions (e.g., a geographical area, such as a city), availability zones (partitioning within a region with dedicated power and cooling), or other fine-grained partitioning of a physical infrastructure (e.g., a semi-isolated rack within a data center).

Node Replacement Controller

In accordance with an embodiment, a node replacement controller is a software component or process of the container orchestration system that drives the process of node replacement, and indirectly and asynchronously interacts with an implementation-specific node processor, and application-specific health controller, through metadata. The node replacement controller discovers nodes that should be processed, reads metadata to determine when the application workload is in a stable state (safe to process nodes), writes metadata to declare those nodes as ready to be processed, and reads metadata to determine when those nodes have finished processing.

Application-Specific Health Controller

In accordance with an embodiment, an application-specific health controller is a software component or process of the container orchestration system, for example a lightweight controller, that is responsible for watching the state of the application workload running within the container orchestration environment, determining if it is in a stable state that can tolerate processing of nodes, and writing that determination to metadata.

Implementation-Specific Node Processor

In accordance with an embodiment, an implementation-specific node processor is a software component or process of the container orchestration system that is responsible for watching metadata for requests to process a node, performing the processing, and writing the state of the processing to metadata.

Containerized (Cloud) Environments

FIG. 1 illustrates an example cloud environment that includes a container orchestration system, in accordance with an embodiment.

In accordance with an embodiment, the components and processes illustrated in FIG. 1, and as further described herein with regard to various embodiments, can be provided as software or program code executable by a computer system or other type of processing device, for example a cloud computing system.

The illustrated example is provided for purposes of illustrating a computing environment within which a container orchestration system can be used to support application workloads. In accordance with other embodiments, the various components, processes, and features described herein can be used with other types of container orchestration systems, or other types of computing environments.

As illustrated in FIG. 1, in accordance with an embodiment, a cloud computing environment (cloud environment) 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108.

In accordance with an embodiment, the cloud environment supports the use of availability domains, such as for example availability domains A 180, and availability domains A B 182, which enables customers to create and access cloud networks 184, 186, and run cloud instances A 192, B 194.

In accordance with an embodiment, a tenancy can be created for each cloud tenant/customer, for example tenant A 142, B 144, which provides a secure and isolated partition within the cloud environment within which the customer can create, organize, and administer their cloud resources. A cloud tenant/customer can access an availability domain and a cloud network to access each of their cloud instances.

In accordance with an embodiment, a client device, such as, for example, a computing device 160 having a device hardware 162 (e.g., processor, memory), and graphical user interface 166, can enable an administrator or other user to communicate with the cloud computing environment via a network such as, for example, a wide area network, local area network, or the Internet, to create or update cloud services.

In accordance with an embodiment, the cloud environment provides access to shared cloud resources 140 via, for example, a compute resources layer 150, a network resources layer 160, and/or a storage resources layer 170. Customers can launch cloud instances as needed, to meet compute and application requirements. After a customer provisions and launches a cloud instance, the provisioned cloud instance can be accessed from, for example, a client device.

In accordance with an embodiment, the compute resources layer can comprise resources, such as, for example, bare metal cloud instances 152, virtual machines 154, graphical processing unit (GPU) compute cloud instances 156, and/or containers 158. The compute resources layer can be used to, for example, provision and manage bare metal compute cloud instances, or provision cloud instances as needed to deploy and run applications, as in an on-premises data center.

For example, in accordance with an embodiment, the cloud environment can provide control of physical host ("bare metal") machines within the compute resources layer, which run as compute cloud instances directly on bare metal servers, without a hypervisor.

In accordance with an embodiment, the cloud environment can also provide control of virtual machines within the compute resources layer, which can be launched, for example, from an image, wherein the types and quantities of resources available to a virtual machine cloud instance can be determined, for example, based upon the image that the virtual machine was launched from.

In accordance with an embodiment, the network resources layer can comprise a number of network-related resources, such as, for example, virtual cloud networks (VCNs) 162, load balancers 164, edge services 166, and/or connection services 168.

In accordance with an embodiment, the storage resources layer can comprise a number of resources, such as, for example, data/block volumes 172, file storage 174, object storage 176, and/or local storage 178.

In accordance with an embodiment, the cloud environment can include a container orchestration system 200, and container orchestration system API 202, that enables containerized application workflows to be deployed to a container orchestration environment 204, for example a Kubernetes cluster.

For example, in accordance with an embodiment, the cloud environment can provide containerized compute cloud instances within the compute resources layer, and a container orchestration implementation (e.g., OKE), can be used to build and launch containerized applications or cloud-native applications, specify compute resources that the containerized application requires, and provision the required compute resources.

Containerized Workflows

Figure 2:
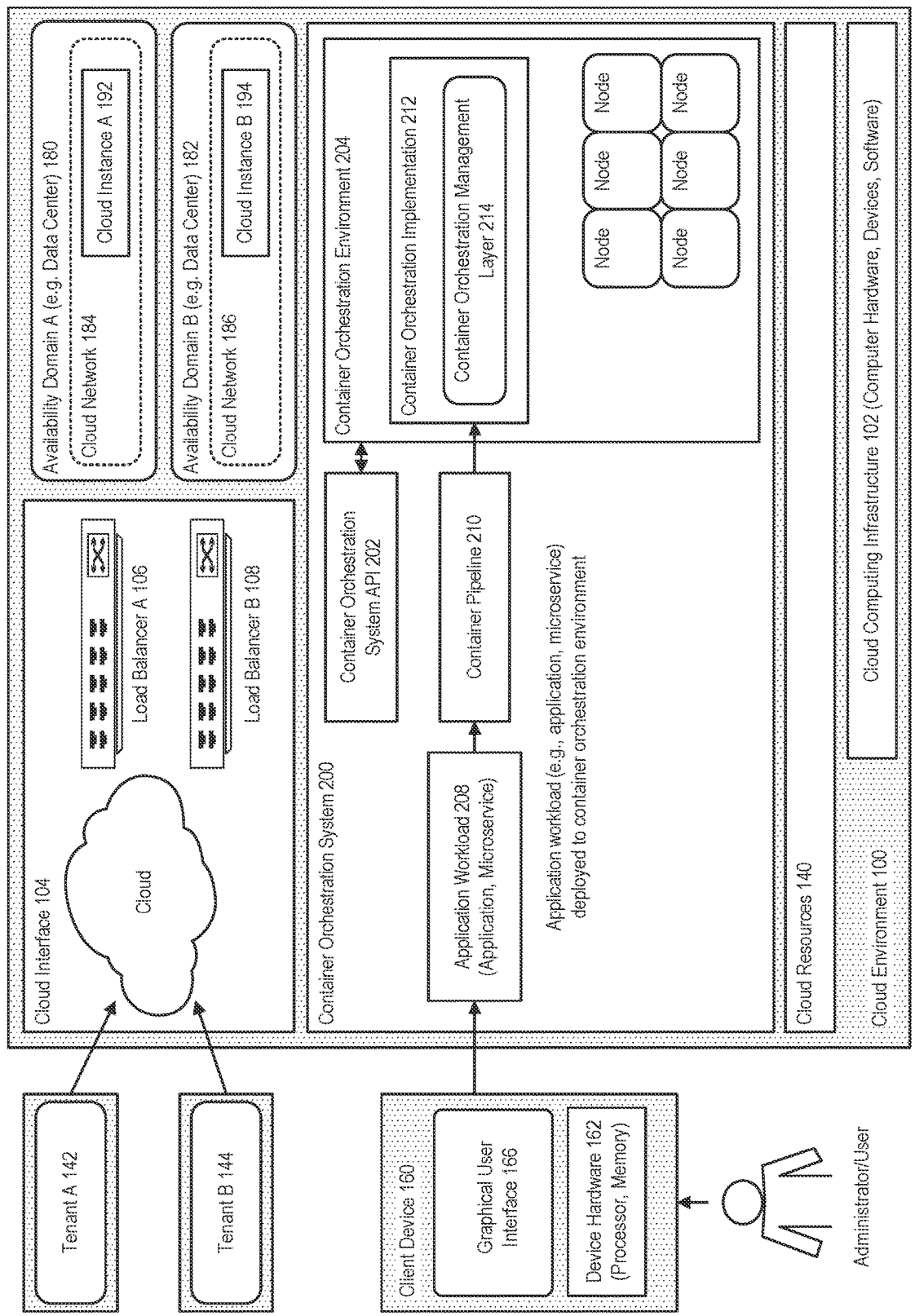
FIG. 2 further illustrates an example cloud environment that includes a container orchestration system, in accordance with an embodiment.
Figure 3:
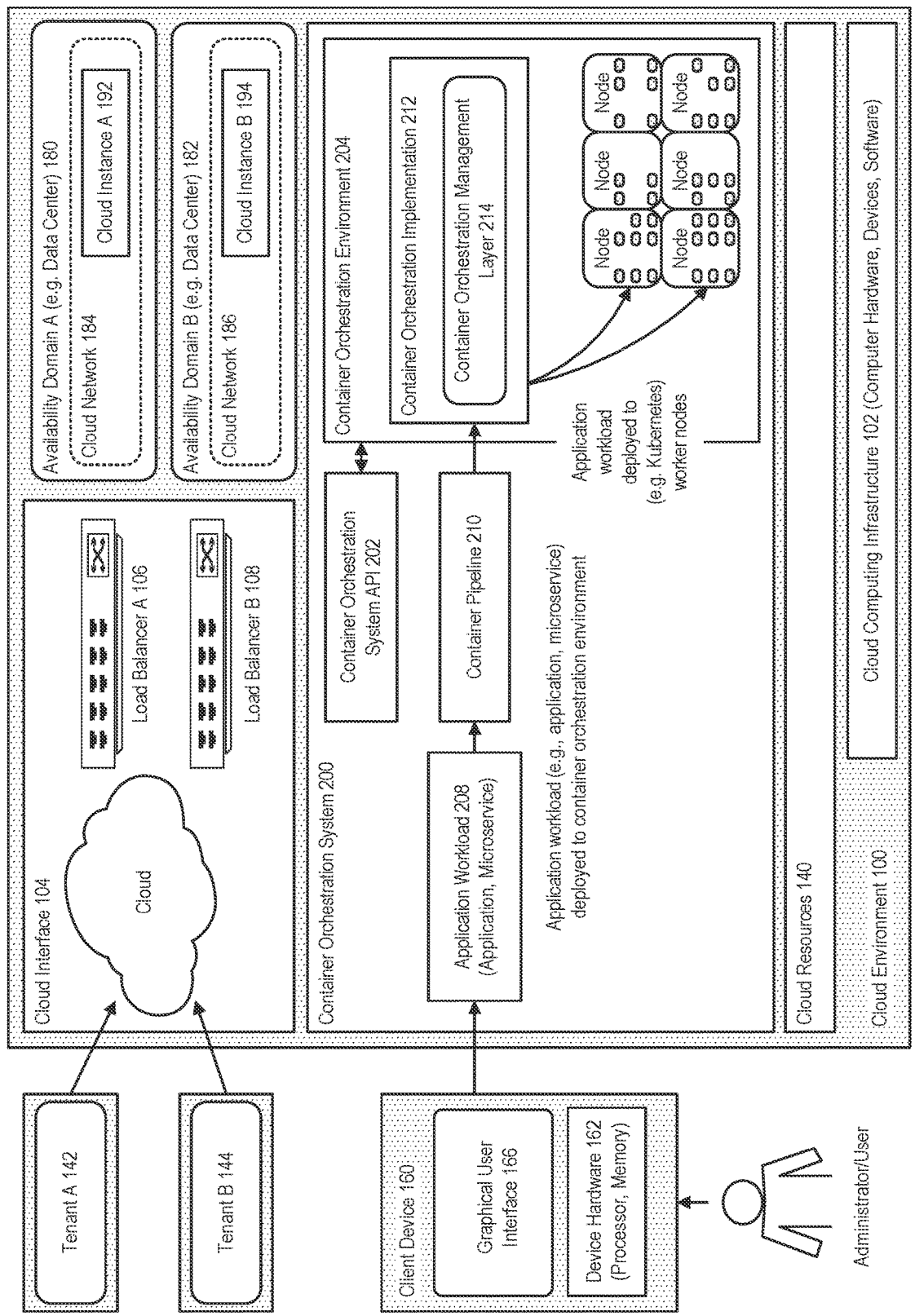
FIG. 3 illustrates the use of a container orchestration system to deploy application workloads to nodes, in accordance with an embodiment.

FIGS. 2-3 further illustrates an example cloud environment that includes a container orchestration system, in accordance with an embodiment.

As illustrated in FIG. 2, in accordance with an embodiment, the container orchestration system enables an application workload 208 (e.g., an application, or microservice) to be deployed to the environment, via a container pipeline 210. The container orchestration implementation (vendor) 212 provides a container orchestration management layer 214 adapted to schedule application workload containers to run on various nodes.

As illustrated in FIG. 3, in accordance with an embodiment, an application workload can be deployed to a plurality of (e.g., Kubernetes) worker nodes.

Figure 4:
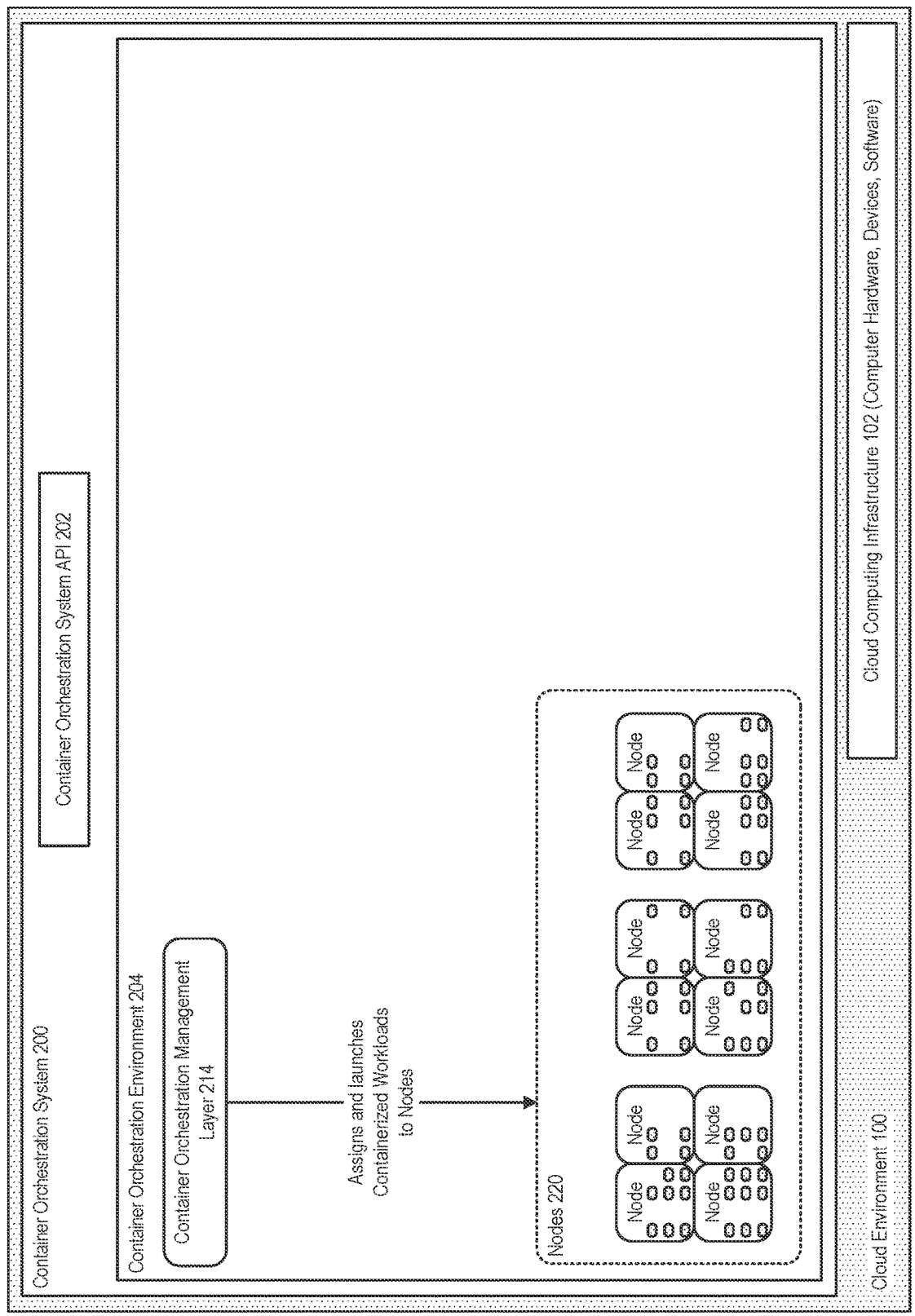
FIG. 4 further illustrates the use of a container orchestration system to deploy application workloads to nodes, in accordance with an embodiment.

As illustrated in FIG. 4, in accordance with an embodiment, the container orchestration environment is adapted to assign and launch containerized workloads to select nodes 220.

Figure 5:
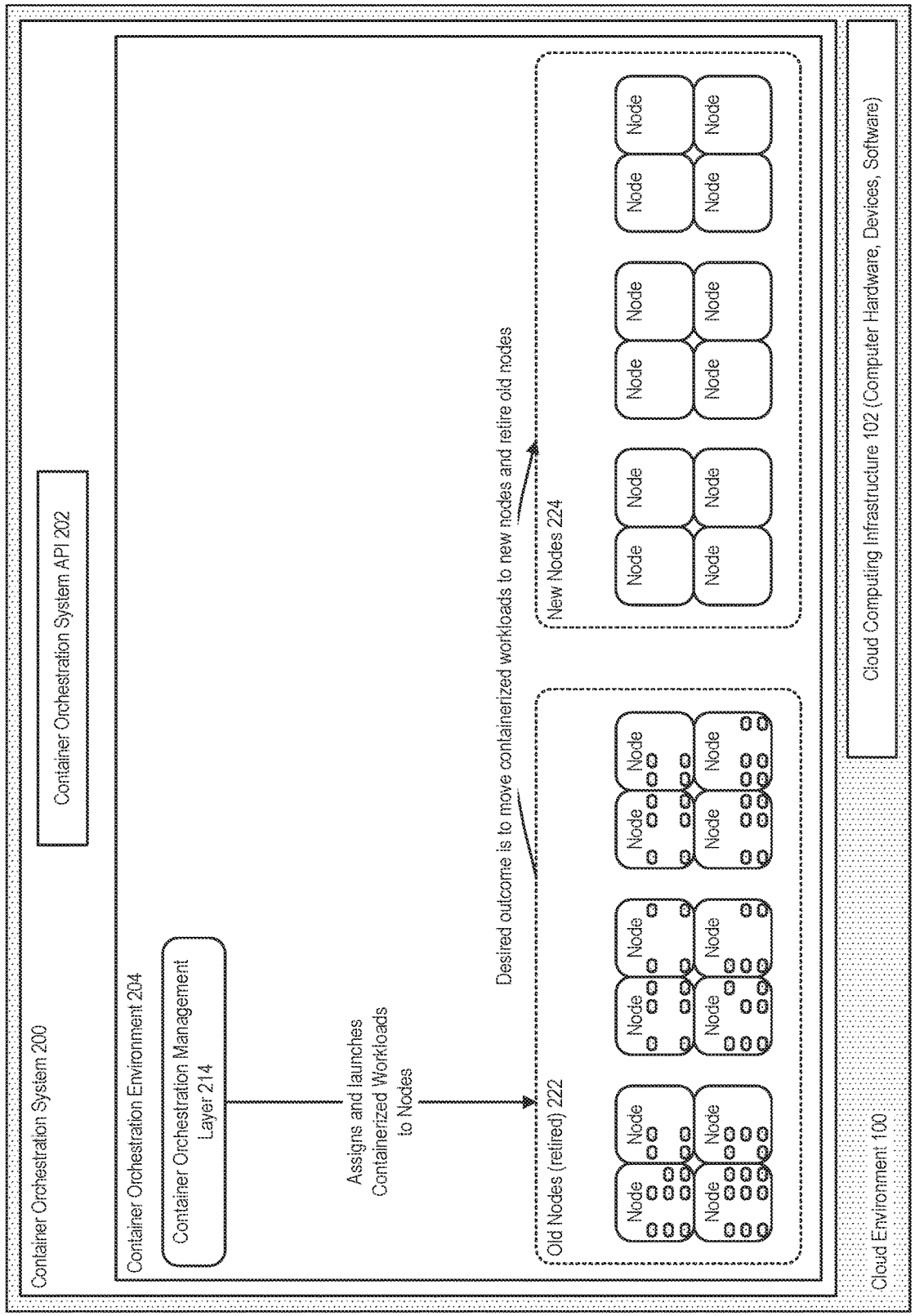
FIG. 5 illustrates the use of a container orchestration system, including moving of containerized application workloads to other nodes, in accordance with an embodiment.

As illustrated in FIG. 5, in accordance with an embodiment, the container orchestration environment is also adapted to move containerized workloads between select nodes, for example between old nodes 222 being retired, and new nodes 224, to achieve a particular or desired outcome.

Figure 6:
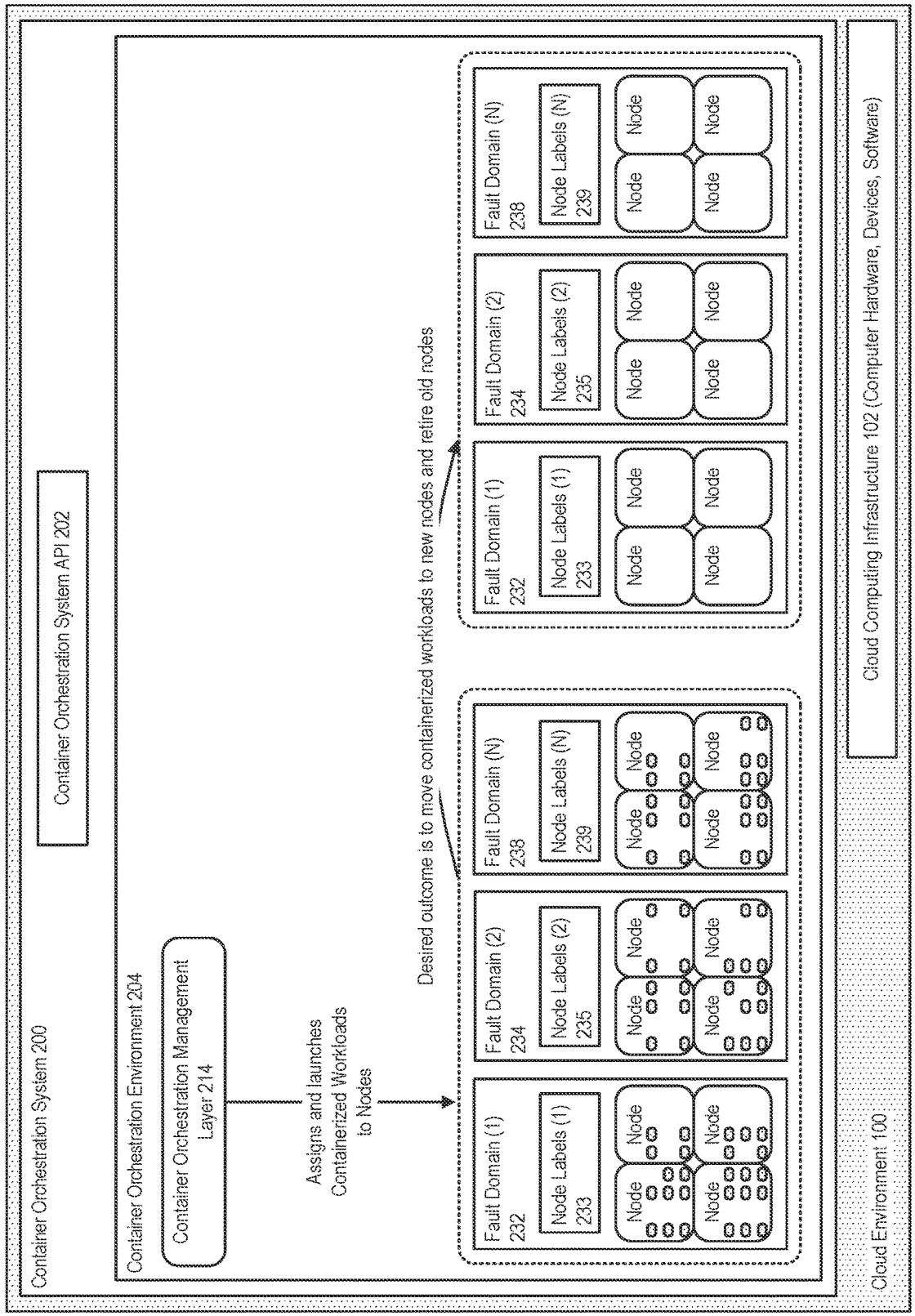
FIG. 6 illustrates the use of a container orchestration system with nodes arranged in fault domains, in accordance with an embodiment.

As illustrated in FIG. 6, in accordance with an embodiment, when fault domains 232, 234, 238 (i.e., groups of nodes that share some physical infrastructure) are employed, then the container orchestration environment is adapted to process nodes by fault domain, for example based on their node labels 233, 235, 239, in parallel within each fault domain.

For example, as further described below, a node replacement controller can process a first batch of nodes with the same fault-domain label (e.g., fault-domain=1) in parallel; and then processes a similar flow for a next batch of nodes (e.g., those with fault-domain=2) after processing of the first batch is complete, and so on.

Containerized Environment Node Replacement

When operating a container orchestration system, a common requirement is the need to replace nodes in a live production environment. This may be necessitated in a variety of scenarios, for example to uptake new base images, or to ensure that production nodes are newer than some arbitrary date.

A typical approach to replacing nodes in a container orchestration environment may involve introducing new nodes to the environment, gracefully shutting down old nodes, and then relying on the functionality provided by the container orchestration system to migrate containers to the new nodes.

However, the migration process is not instantaneous, and even using a graceful shutdown, application functionality may be impaired for a period of time as each node is processed. Well-designed applications that implement redundancy will continue providing service in these cases, but even then it is likely that redundancy has been weakened for a period of time.

Generally, it is not feasible to process all of the nodes in the environment at the same time, otherwise application downtime will occur.

However, processing each or some of the nodes one at a time can result in an extremely long overall processing time for environments with hundreds or thousands of nodes.

Even if the nodes are processed one at time, it can be difficult to determine, after a node has been processed, when the application workload has reached a stable state, where it is able to tolerate processing of subsequent nodes. In particular, the determination as to when the application is actually in a stable state to continue node processing is heavily dependent on the application workload itself. Some applications may rely on mostly stateless components and reach a stable state quickly; whereas other applications may take minutes or hours to reach a stable state.

For example, in an environment that includes a number of data analytics clusters operating within the container orchestration environment, wherein the running application workload triggers a rebalancing of data between cluster members whenever a container moves, and the cluster maintains two copies of data for high-availability purposes; then depending on the size of the data, moving data between nodes could take hours or days to complete. Although all of the data will remain accessible while one copy of it is being moved, due to the availability of the second copy, the application workload is such that it may not be advisable to process additional nodes while the container move operation is in progress. Doing so could take the only remaining copy of data offline, resulting in data unavailability.

Node Replacement Controller

In accordance with an embodiment, a node replacement controller drives the process of node replacement, and indirectly and asynchronously interacts with an implementation-specific node processor, and application-specific health controller, through metadata.

In accordance with an embodiment, the node replacement controller discovers nodes that should be processed, reads metadata to determine when the application workload is in a stable state (safe to process nodes), writes metadata to declare those nodes as ready to be processed, and reads metadata to determine when those nodes have finished processing.

In accordance with an embodiment, the node replacement controller can be implemented once for a given type of container orchestration system, and then applied to other container orchestration implementations (vendors) and workload types using that container orchestration system.

In accordance with an embodiment, the node replacement controller is able to take the application workload into account when deciding when the application workload is safe to process nodes, and can determine which nodes can be processed in parallel, to optimize the overall replacement of nodes.

Additionally, since the mechanics of replacing a node vary between different container orchestration vendors; and it may be undesirable to have to re-implement an entire node replacement system for each vendor; in accordance with an embodiment, the node replacement controller can be implemented once for a given type of container orchestration system, and then applied to other container orchestration implementations (vendors) and workload types using that container orchestration system. The actual work of replacing an individual node can then be delegated to vendor-specific logic.

Figure 7:
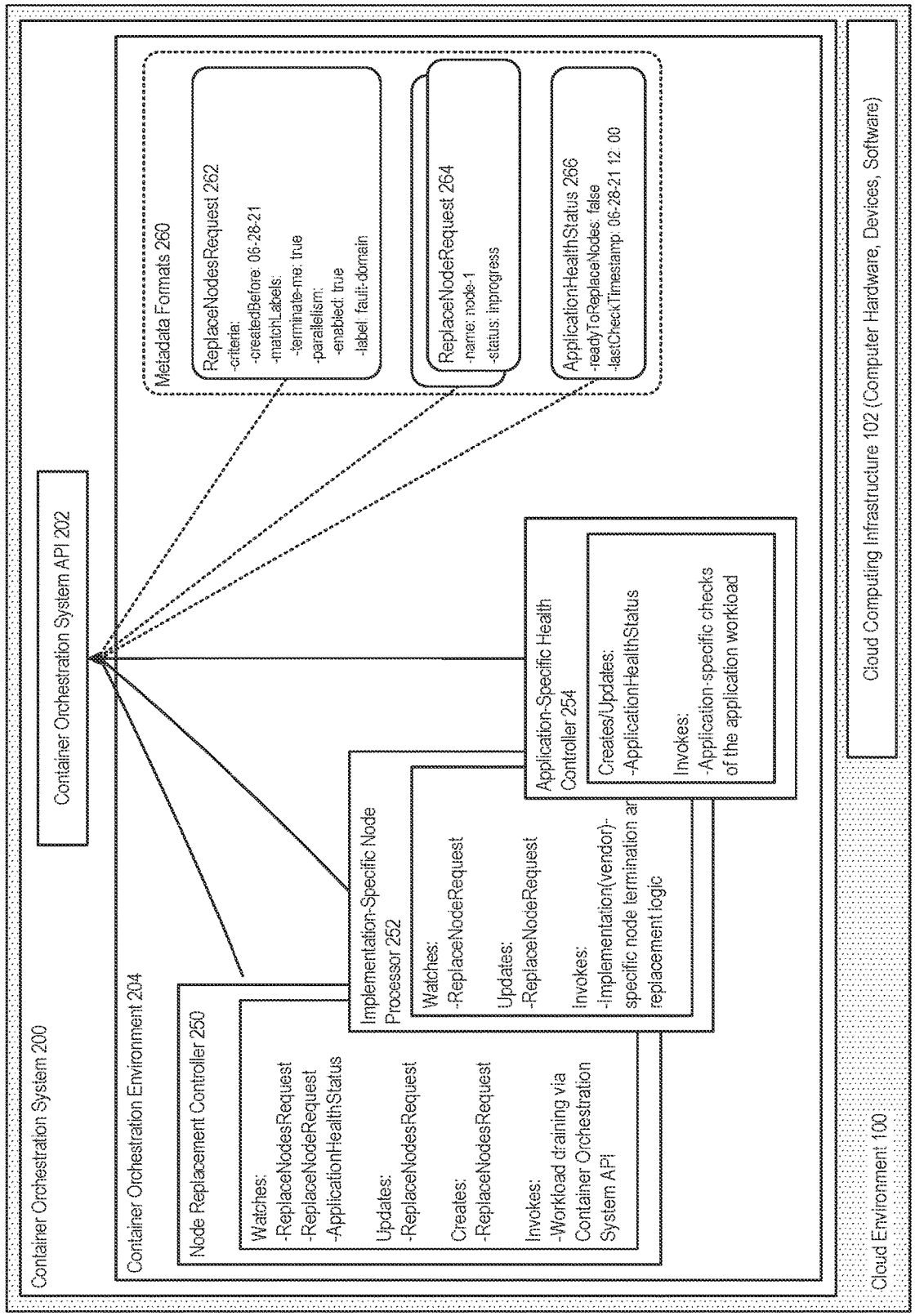
FIG. 7 illustrates a container orchestration environment that includes a node replacement controller adapted to communicate with other controllers or processors via metadata formats, for purposes of controlling replacement of nodes, in accordance with an embodiment.

FIG. 7 illustrates a container orchestration environment that includes a node replacement controller adapted to communicate with other controllers or processors via metadata formats, for purposes of controlling replacement of nodes, in accordance with an embodiment.

As illustrated in FIG. 7, in accordance with an embodiment, the container orchestration includes a node replacement controller 250, indirectly and asynchronously interacts with an implementation-specific node processor 252, and application-specific health controller 254, through metadata formats (metadata) 260.

In accordance with an embodiment, a node replacement controller is a software component or process of the container orchestration system that drives the process of node replacement, and indirectly and asynchronously interacts with an implementation-specific node processor, and application-specific health controller, through metadata. The node replacement controller discovers nodes that should be processed, reads metadata to determine when the application workload is in a stable state (safe to process nodes), writes metadata to declare those nodes as ready to be processed, and reads metadata to determine when those nodes have finished processing.

In accordance with an embodiment, an application-specific health controller is a software component or process of the container orchestration system, for example a lightweight controller, that is responsible for watching the state of the application workload running within the container orchestration environment, determining if it is in a stable state that can tolerate processing of nodes, and writing that determination to metadata.

The application-specific health controller is implemented for the specific application workload running in the container orchestration environment.

In accordance with an embodiment, an implementation-specific node processor is a software component or process of the container orchestration system that is responsible for watching metadata for requests to process a node, performing the processing, and writing the state of the processing to metadata.

The implementation-specific node processor is implemented once for a given container orchestration implementation (vendor).

Metadata Formats

In accordance with an embodiment, the node replacement controller indirectly and asynchronously interacts with the implementation-specific node processor, and application-specific health controller, through metadata types which serve as the contract between the various components, examples of which are illustrated below (in YAML format):

A. Metadata—ReplaceNodesRequest

In accordance with an embodiment, the ReplaceNodesRequest metadata type declares that a node replacement activity should occur across the container orchestration environment, and has the format:

```
criteria:
   createdBefore: <timestamp>
   matchLabels:
      <label_name1>: <label_value1>
      <label_name2>: <label_value2>
   faultDomainPriority:
      <fault_domain_label1>
      <fault_domain_label2>
      . . .
   parallelism:
      enabled: <true|false>
      label: <fault_domain_label>
   status: <completed|inprogress|failed|invalid>
```

B. Metadata—ReplaceNodeRequest

In accordance with an embodiment, the ReplaceNodeRequest metadata type declares that a specific named node should be replaced. ReplaceNodeRequests are created by the node replacement controller (one for each intended node replacement), and acted on by the implementation-specific node processor. The ReplaceNodeRequest metadata type has the format:

```
name: <node_name>
status: <completed|inprogress|failed>
```

C. Metadata—ApplicationHealthStatus

In accordance with an embodiment, the ApplicationHealthStatus metadata type declares the status of the application workload: for example whether or not is in a stable state, or able to tolerate processing of nodes. The ApplicationHealthStatus is created and updated (one per container orchestration environment) by the application-specific health controller, and has the format:

readyToReplaceNodes: <true|false>
lastCheckTimestamp: <timestamp_of_last_check>

Application-Specific Health Controller

In accordance with an embodiment, the application-specific health controller is responsible for watching the state of the application workload running within the container orchestration environment, determining if it is in a stable state that can tolerate processing of nodes, and writing that determination or status to the ApplicationHealthStatus Metadata. The particular data that defines the health of the application is dependent on the application workload itself.

Based on the results of the application-specific health controller's check, it will write an ApplicationHealthStatus (one for the entire container orchestration environment) indicating either success:

readyToReplaceNodes: true
lastCheckTimestamp: 06-28-21 12:00:17 or failure:

readyToReplaceNodes: false
lastCheckTimestamp: 06-28-21 12:00:17

Implementation-Specific Node Processor

In accordance with an embodiment, the implementation-specific node processor implements a watcher on ReplaceNodeRequest metadata instances; which is capable of processing multiple ReplaceNodeRequests in parallel, since the node replacement controller will be creating a separate ReplaceNodeRequest to process each node, and parallel processing is supported, as mentioned above. Prior to a ReplaceNodeRequest being created for a given node, it will have its workload drained and scheduling of new workloads disabled by the node replacement controller.

The particular functioning of the implementation-specific node processor is dependent on the vendor. Possible variations may include, for example:

(a) Do nothing—for some vendors, a "node pool" of new nodes would need to be created out-of-band, prior to the entire node replacement, and the old "node pool" deleted out-of-band after the entire node replacement has finished, and for such a vendor, only draining the workload and disabling scheduling of new workloads (which the node replacement controller does) is needed; or (b) Terminate the node (e.g., using IaaS APIs), and wait for a new replacement node to be automatically recreated (by the IaaS provider).

In accordance with other embodiments and other types of implementation-specific node processor, other variations can be provided by the vendor as appropriate. When the implementation-specific node processor is finished processing a given node's ReplaceNodeRequest, it updates its status field to indicate completed, which signifies to the node replacement controller that processing of that node has been completed:

name: <node_name>
status: completed

Node Replacement Process

Figure 8:
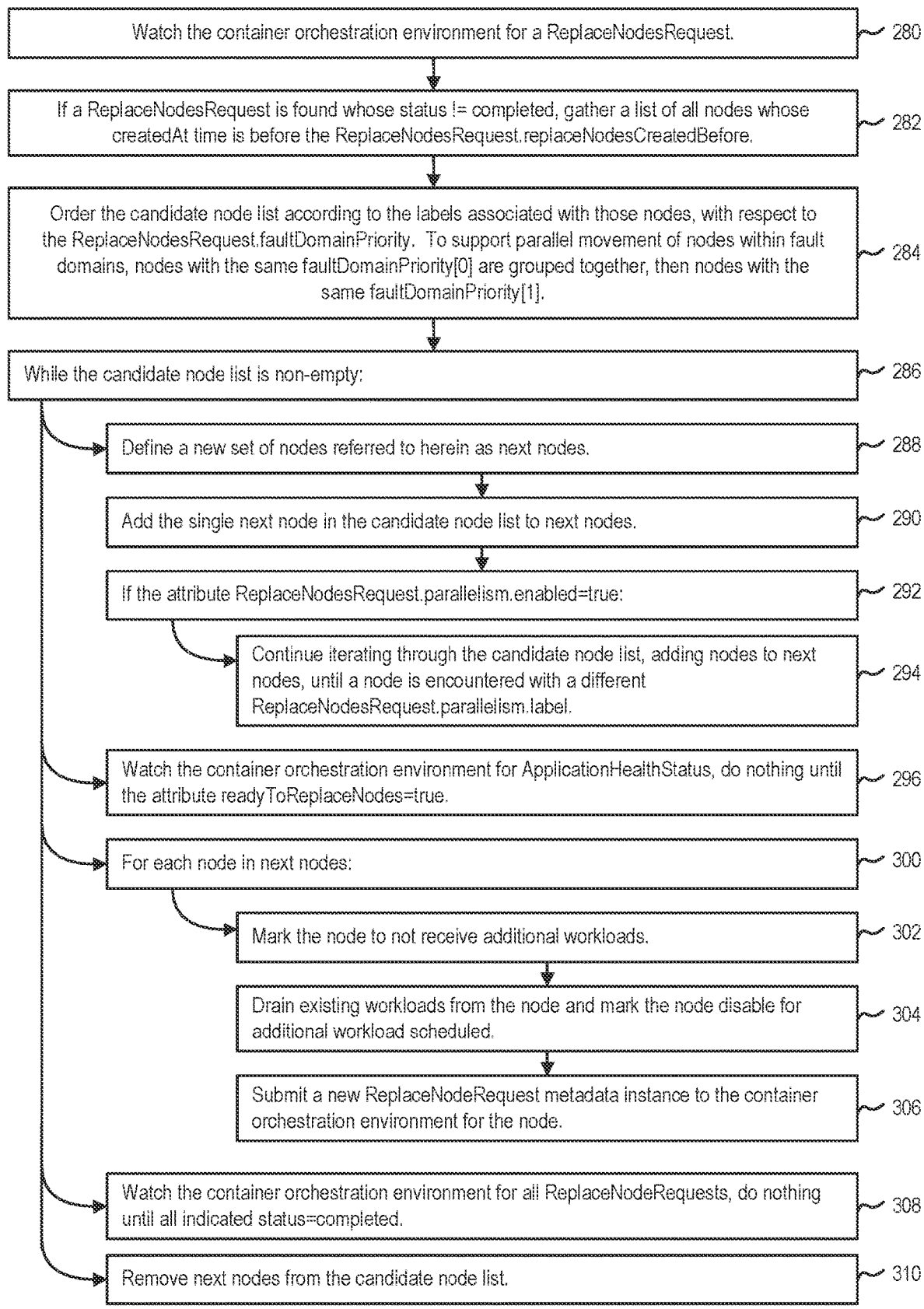
FIG. 8 illustrates an example node replacement process or algorithm, for use with a container orchestration system, in accordance with an embodiment.

FIG. 8 illustrates an example node replacement process or algorithm, for use with a container orchestration system, in accordance with an embodiment.

As illustrated in FIG. 8, in accordance with an embodiment, the node replacement process, as determined by the node replacement controller is as follows:

At 280, the node replacement controller watches the container orchestration environment for a ReplaceNodesRequest. This is the metadata type that triggers the node replacement controller to kick into action.

At 282, if a ReplaceNodesRequest is found whose status !=completed, the node replacement controller gathers a list of all nodes whose createdAt time is before the ReplaceNodesRequest.replaceNodesCreatedBefore. This list of nodes is the candidate node list.

At 284, the node replacement controller orders the candidate node list according to the labels associated with those nodes, with respect to the ReplaceNodesRequest.faultDomainPriority. To support parallel movement of nodes within fault domains, nodes with the same faultDomainPriority[0] are grouped together, then nodes with the same faultDomainPriority[1].

At 286, while the candidate node list is non-empty, the node replacement controller operates to:

Define a new set of nodes referred to herein as next nodes (288).

Add the single next node in the candidate node list to next nodes (290).

If the attribute ReplaceNodesRequest.parallelism.enabled=true (292): continue iterating through the candidate node list, adding nodes to next nodes, until a node is encountered with a different ReplaceNodesRequest.parallelism.label (294).

Watch the container orchestration environment for ApplicationHealthStatus, do nothing until the attribute readyToReplaceNodes=true (296).

At 300, for each node in next nodes:

Mark the node to not receive additional workloads (302).

Drain existing workloads from the node and mark the node disable for additional workload scheduled (304). This operation can be performed using the container orchestration system's APIs.

Submit a new ReplaceNodeRequest metadata instance to the container orchestration environment for the node (306). This is the metadata type that triggers the implementation-specific node processor to kick into action.

Watch the container orchestration environment for all ReplaceNodeRequests, do nothing until all indicated status=completed (308).

Remove next nodes from the candidate node list (310).

FIGS. 9-16 illustrate an example use of a node replacement controller with running workloads, in accordance with an embodiment.

Figure 9:
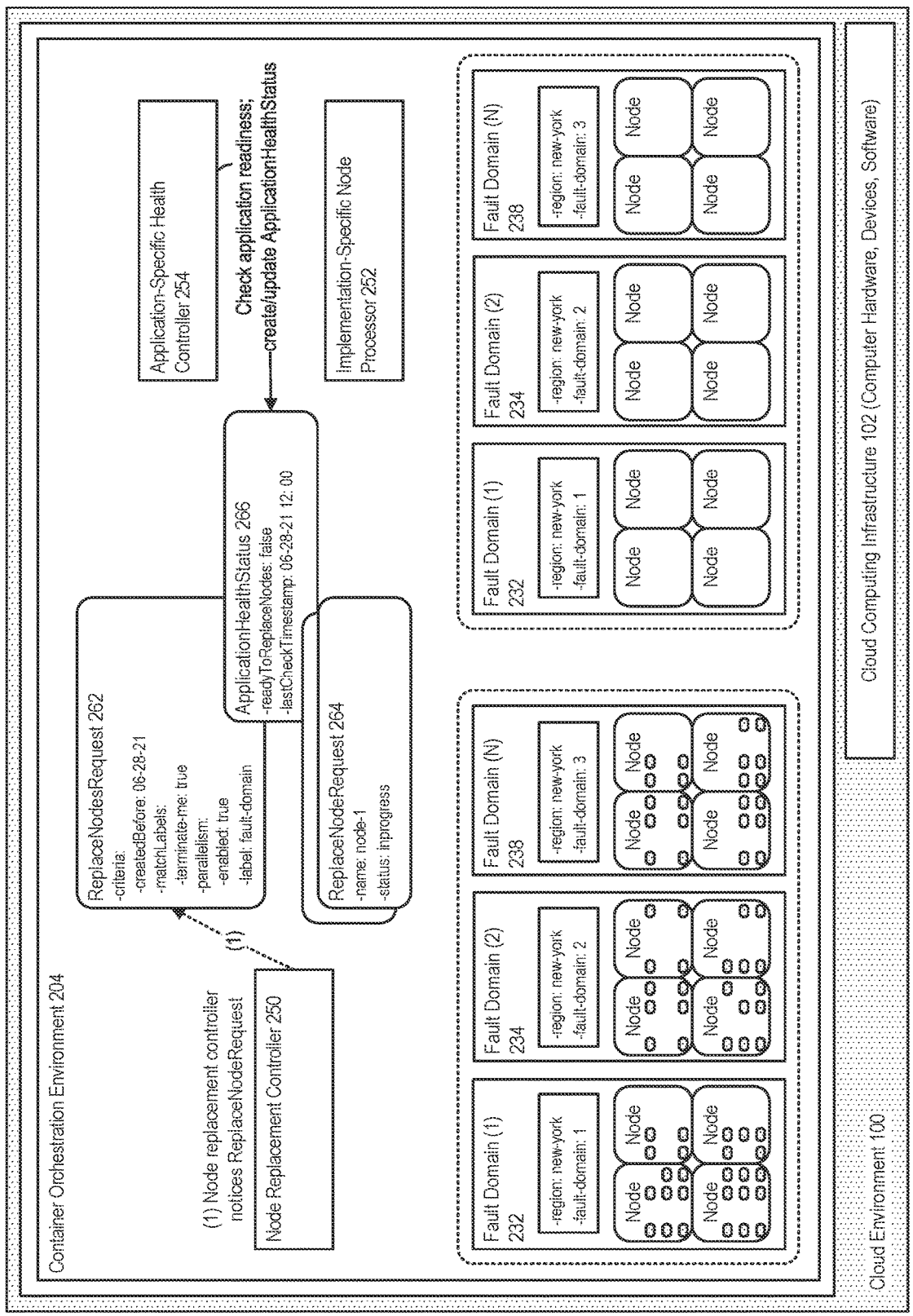
FIG. 9 illustrates an example use of a node replacement controller with running workloads, in accordance with an embodiment.

As illustrated in FIG. 9, in accordance with an embodiment, and generally as described above, at (1) the node replacement controller notices ReplaceNodeRequest. During the process, the application-specific health controller asynchronously/continually checks application readiness; and creates/updates the ApplicationHealthStatus as appropriate.

Figure 10:
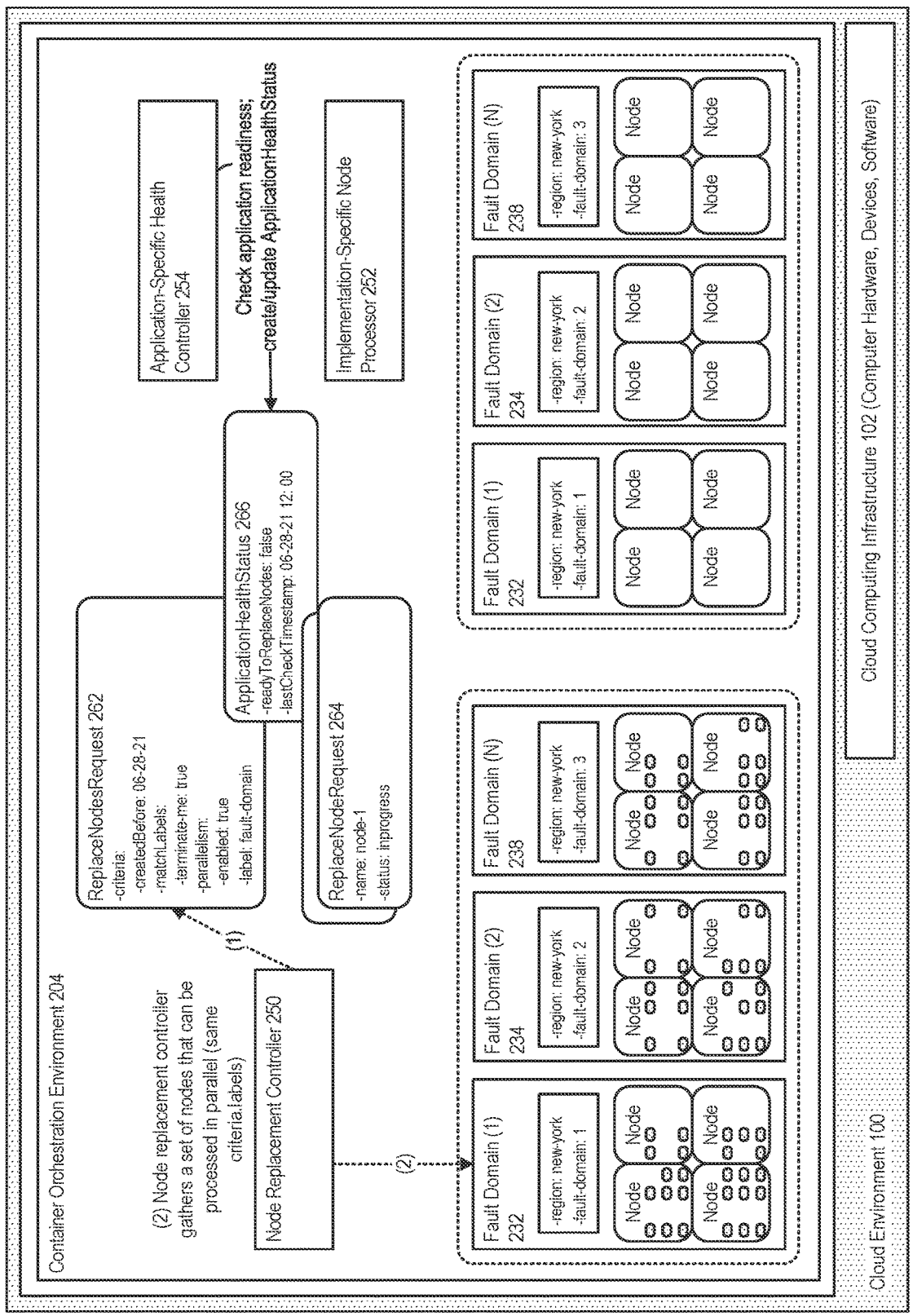
FIG. 10 further illustrates an example use of a node replacement controller with running workloads, in accordance with an embodiment.

As illustrated in FIG. 10, in accordance with an embodiment, at (2) the node replacement controller gathers a set of nodes that can be processed in parallel (same criteria.labels)

Figure 11:
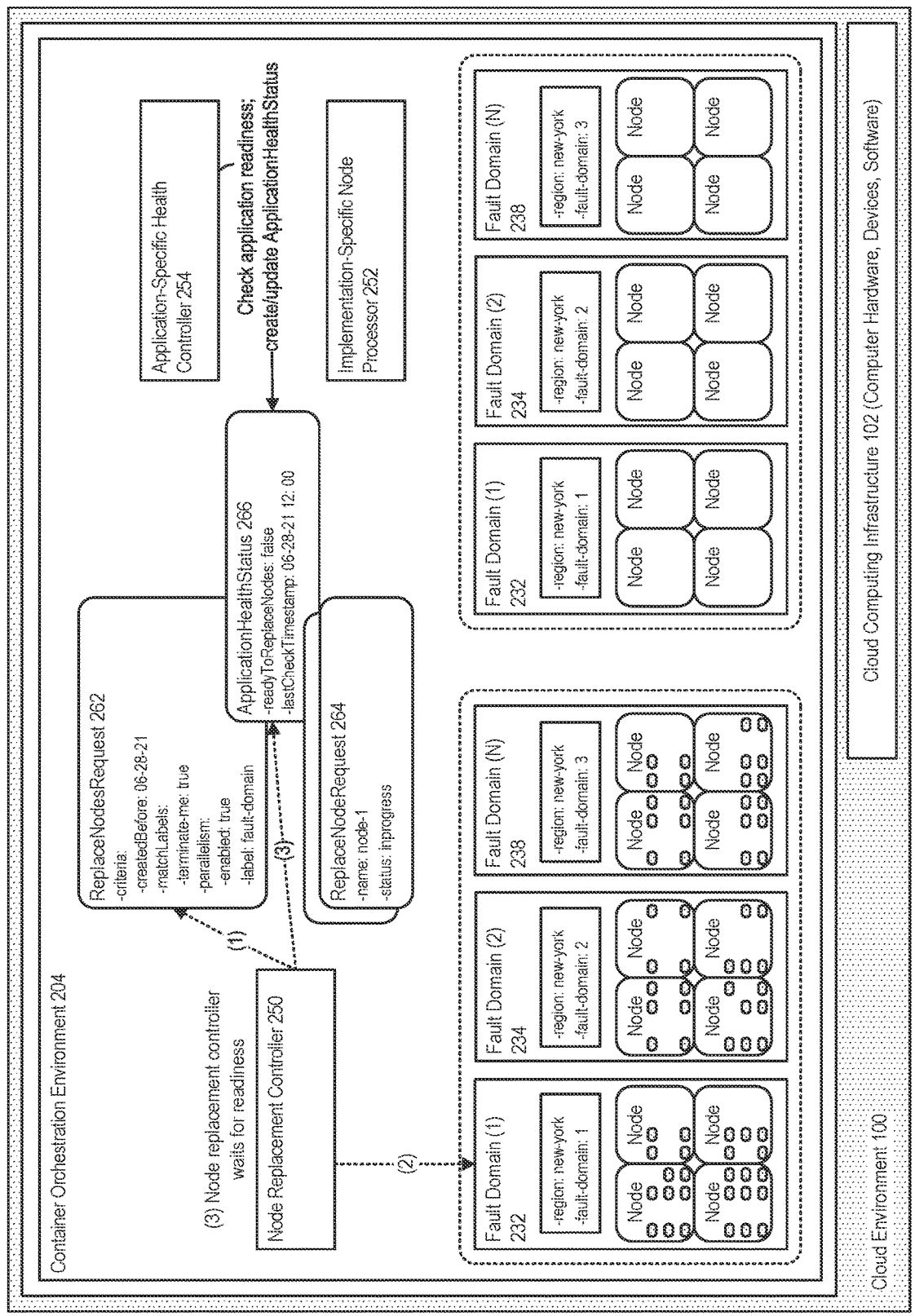
FIG. 11 further illustrates an example use of a node replacement controller with running workloads, in accordance with an embodiment.

As illustrated in FIG. 11, in accordance with an embodiment, at (3) the node replacement controller waits for readiness; and thereafter creates a ReplaceNodeRequest for each node meant to be processed in parallel.

Figure 12:
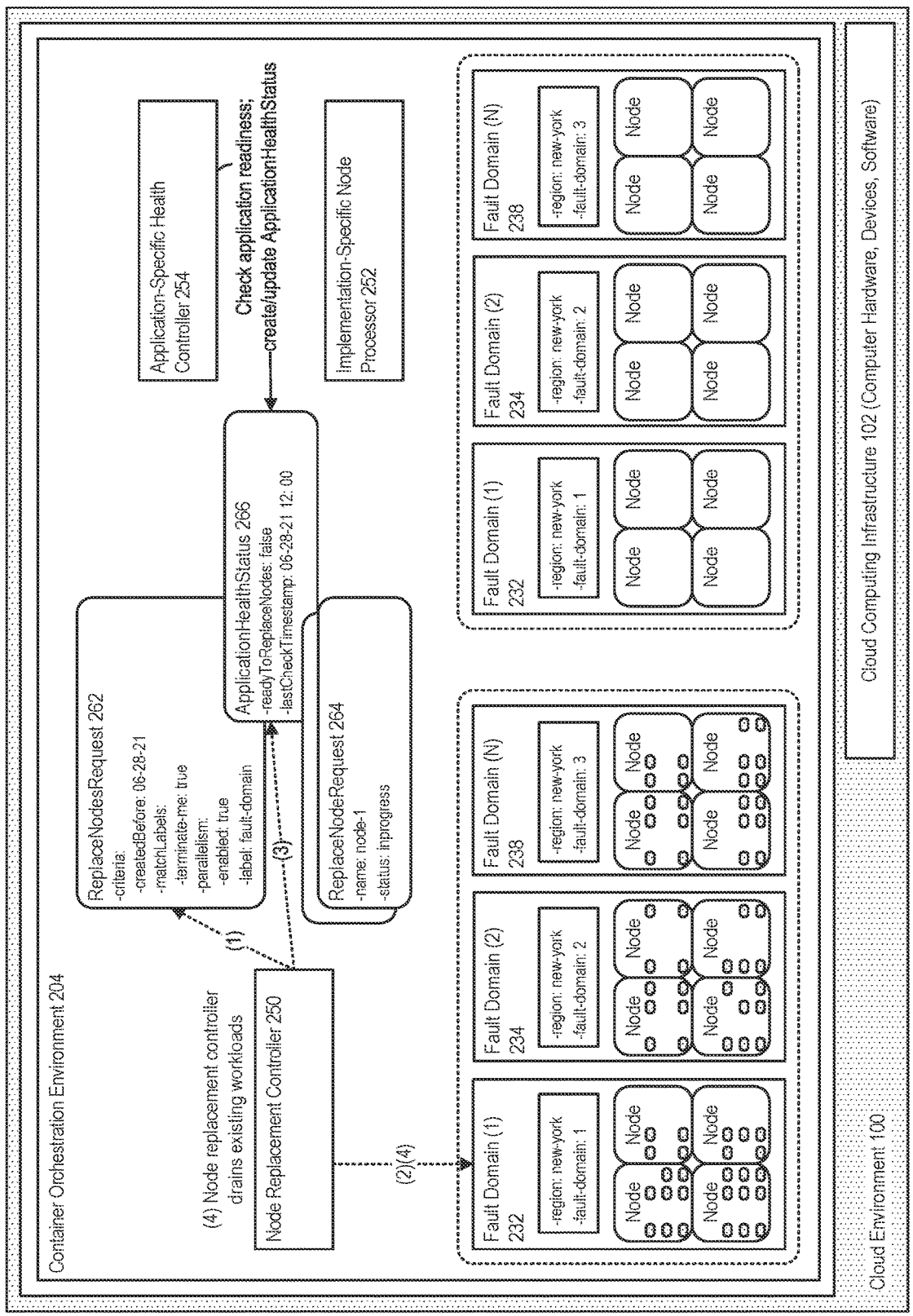
FIG. 12 further illustrates an example use of a node replacement controller with running workloads, in accordance with an embodiment.

As illustrated in FIG. 12, in accordance with an embodiment, at (4) the node replacement controller drains existing workloads from the nodes.

Figure 13:
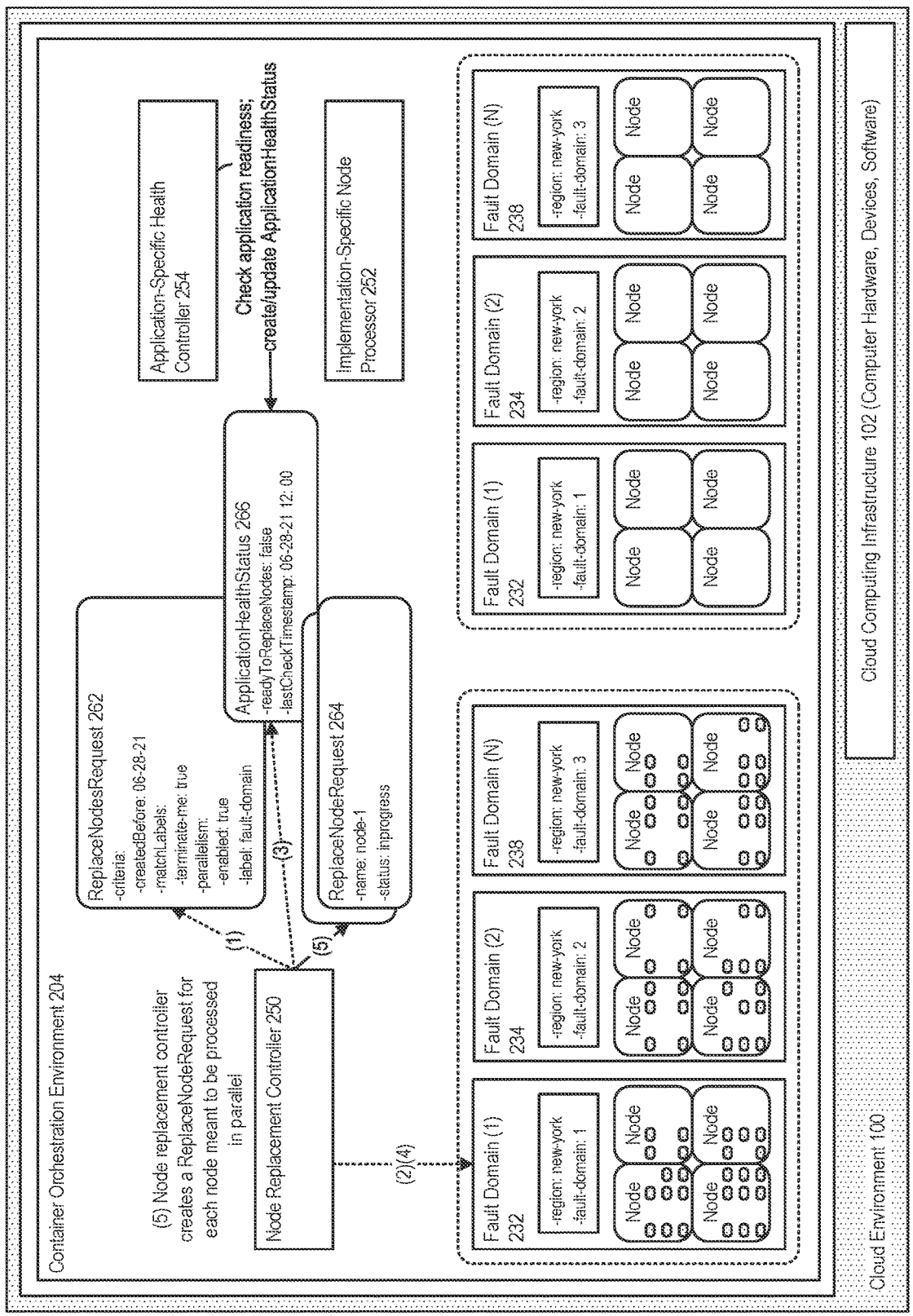
FIG. 13 further illustrates an example use of a node replacement controller with running workloads, in accordance with an embodiment.

As illustrated in FIG. 13, in accordance with an embodiment, at (5) the node replacement controller creates a ReplaceNodeRequest for each node meant to be processed in parallel.

Figure 14:
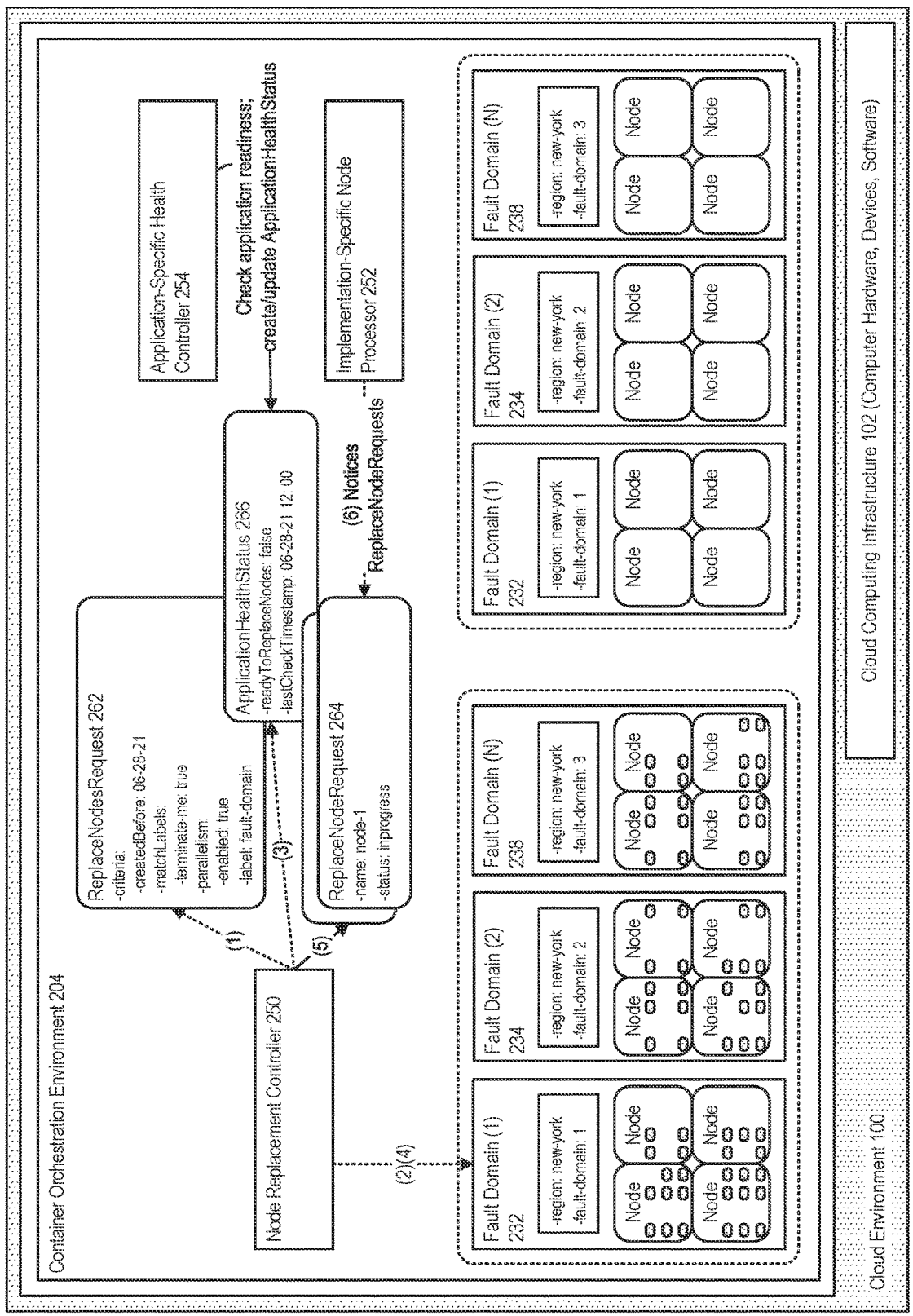
FIG. 14 further illustrates an example use of a node replacement controller with running workloads, in accordance with an embodiment.

As illustrated in FIG. 14, in accordance with an embodiment, at (6) the implementation-specific node processor notices the ReplaceNodeRequests.

Figure 15:
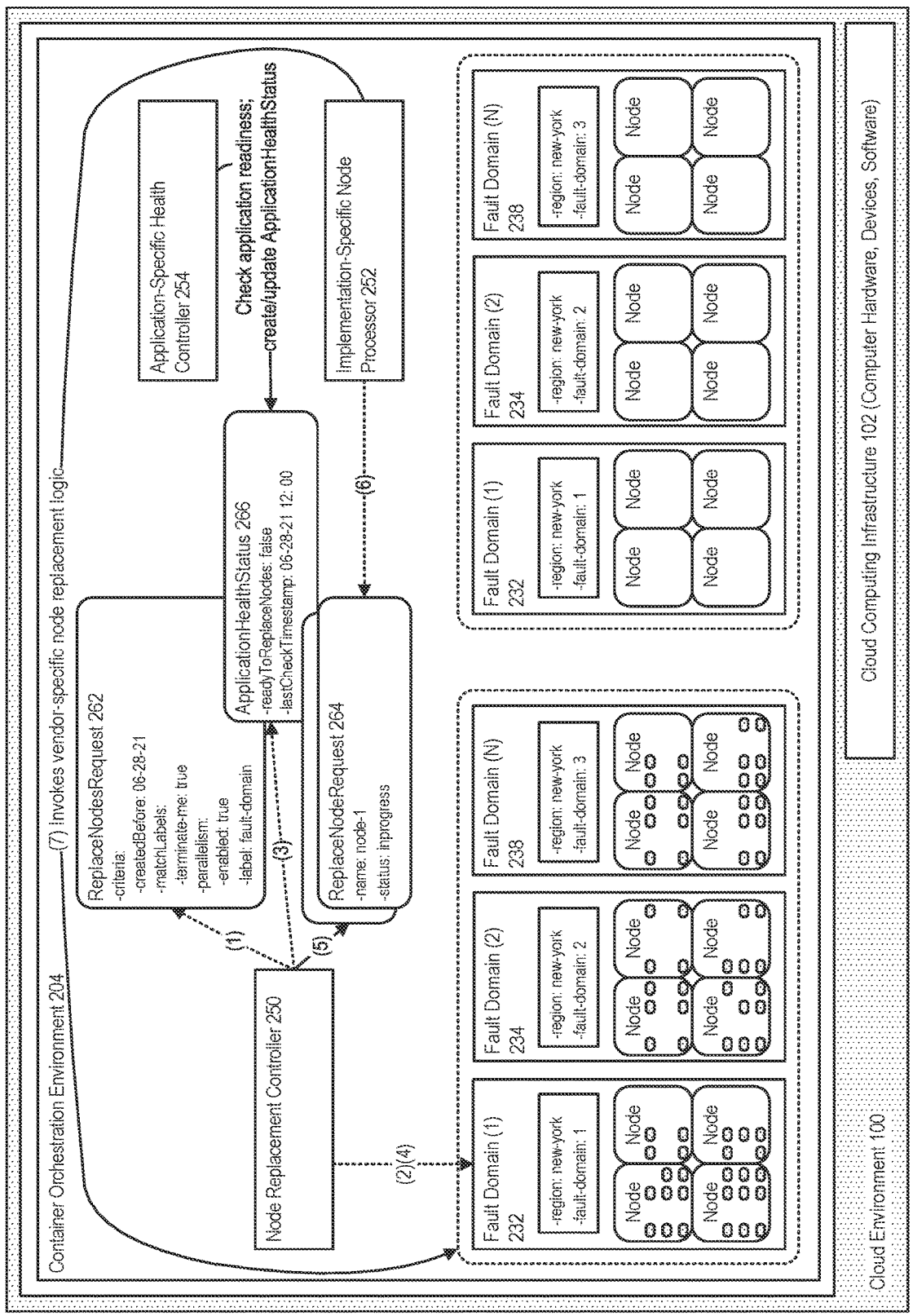
FIG. 15 further illustrates an example use of a node replacement controller with running workloads, in accordance with an embodiment.

As illustrated in FIG. 15, in accordance with an embodiment, at (7) implementation-specific node processor invokes its implementation-specific (vendor-specific) node replacement logic.

Figure 16:
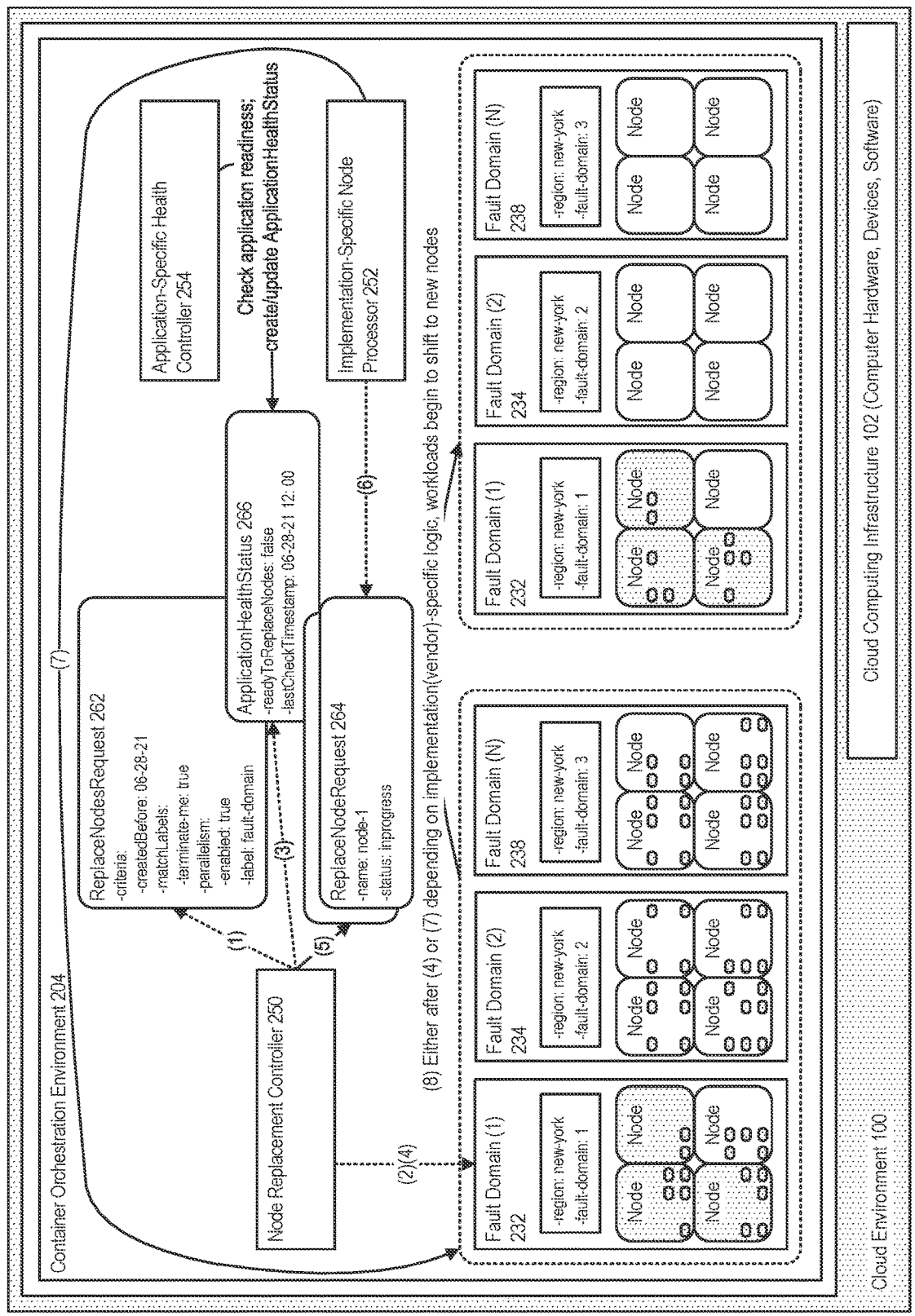
FIG. 16 further illustrates an example use of a node replacement controller with running workloads, in accordance with an embodiment.

As illustrated in FIG. 16 in accordance with an embodiment, at (8) and after either (4) or (7) complete, depending on the implementation-specific (vendor-specific) node replacement logic, workloads begin to shift to the new nodes.

Node Replacement Process Error Handling

In accordance with an embodiment, the implementation-specific node processor should be written with sufficient retry capabilities. If, despite retries, the replacement of a given node fails, it should set ReplaceNodeRequest.status=failed for the node's corresponding ReplaceNodeRequest. This will signify to the node replacement controller to halt subsequent node replacements, and set the overall ReplaceNodesRequest.status=failed. A human operator can then intervene as appropriate.

In accordance with an embodiment, an invalid ReplaceNodesRequest (e.g., specifying no criteria) will result in the node replacement controller marking ReplaceNodesRequest.status as "invalid" and taking no further action. A ReplaceNodesRequest. status=invalid can be used to signal a human operator that something is wrong with the ReplaceNodesRequest and they can then intervene as appropriate.

Node Replacement Process Invocation

In accordance with an embodiment as describe above, the overall node replacement process can be triggered by the creation of a ReplaceNodesRequest. This metadata can be added to the container orchestration environment either by a human operator or automated tooling, to support additional use cases, for example:

An operations team may wish to replace nodes older than a given date; to do this, they can create a ReplaceNodesRequest with criteria.createBefore set to the target date.

An operations team may wish to replace target nodes only; to do this, they can provide human operator labels on selected nodes with some unique key-value (e.g., via the container orchestration system API), and then system can then create a ReplaceNodesRequest with criteria.matchLabels set to match that key-value setting.

Implementation Example

In accordance with an embodiment, various details of a particular implementation or embodiment are provided below. The description is provided for the purposes of illustration and description. It is not intended to be exhaustive or to limit the scope of protection to the precise forms disclosed. Many modifications and variations will be apparent to the practitioner skilled in the art.

By way of illustrative example, in accordance with an embodiment that uses Kubernetes as a container orchestration system, a node replacement controller can be implemented exactly once for Kubernetes, and then applied to any other vendor or application workload. Kubernetes supports the use of "CustomerResources". For each of the metadata types defined above (ReplaceNodesRequest, ReplaceNodeRequest, ApplicationHealthStatus), a "CustomerResourceDefinition" can be used to declare a metadata schema, and CustomResources of these types used as metadata instances for use by the various controllers.

Since Kubernetes provides clients for many languages, the Controllers can use available Kubernetes client APIs to perform event watching, for example to discover CustomResource instances of type ReplaceNodesRequest/ReplaceNodeRequest/ApplicationHealthStatus, and then interact with them, for example to watch and/or update, as described above.

By way of illustrative example, in accordance with an embodiment that uses Oracle Cloud Infrastructure (OCI) and Oracle Container Engine for Kubernetes (OKE), a vendor-specific node processor can be implemented once for OCI (OKE) by, for example:

Option 1: Managing OKE "node pools" out of band (manually by an operations team), wherein the operations team introduces new (initially unused) nodes to the system by adding OKE node pool(s) manually, before any automated process is triggered. In this example, the node replacement controller already contains the (Kubernetes-generic) logic to drain workloads from old nodes. The operations team can manually remove old node pool(s) following the automated process.

Option 2: Terminate nodes and allow OCI/OKE create replacements, for example, terminating nodes via the OCI API, after which OKE will create a fresh replacement node. In this example, the vendor-specific node processor, when processing a given node, will terminate the node via the OCI API, wait until a replacement has been created (via OCI API) and added to the Kubernetes cluster, and then indicate success in the corresponding ReplaceNodeRequest.

By way of illustrative example, in accordance with an embodiment that uses one or more data analytics clusters running within a Kubernetes cluster—such a system can take a considerable amount of time to reach a stable state after one of its cluster members has by stopped and restarted, often due to the potential of many shards being moved around/rebalanced within the cluster. As described above, to avoid data loss it may be important to ensure that the all expected copies of data are replicated and available prior to initiating processing of an arbitrary, e.g., Kubernetes worker node.

In such an example, the application-specific health controller corresponding to this type of workload can ping the data analytics clusters running within the Kubernetes cluster, and only report "ready" when all clusters report all shards to be "green". If the system is configured so that each shard has a copy on two distinct availability domains, the application workload can be adapted to tolerate all of the Kubernetes worker nodes in the same availability domain being processed (getting replaced) in parallel (by setting a ReplaceNodesRequest.parallelism.label=<oci_availability_domain_node_label>).

Technical Advantages

In accordance with an embodiment, various technical advantages of the described approach can include, for example:

Ability to replace nodes in a way that is aware of the application workload running.

A single controller than be applied generically to multiple vendors.

Optimization of the node replacement process through the use of fault domains: allowing the possibility of processing nodes in the same fault domain in parallel (if so indicated in the ReplaceNodesRequest).

The use of a single/generic node replacement controller to drive node replacement avoids an operations team having to write an entire node replacement tooling from scratch for each workload.

The use of a single/generic node replacement controller to drive node replacement avoids an operations team having to write the entire node replacement tooling from scratch for each vendor.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although various examples are described above that illustrate usage in OCI, and Kubernetes environments, the various components, processes, and features described herein can be used with other types of container orchestration systems, or other types of computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing replacement of nodes in a containerized environment, comprising:
    a container orchestration system that provides within one or more container orchestration environments, a runtime for containerized workloads and services; and
    a node replacement controller that interacts, through metadata, with an implementation-specific node processor, and application-specific health controller, to drive the process of node replacement within the one or more container orchestration environments, including that the node replacement controller and implementation-specific node processor communicate via metadata types wherein:
        the node replacement controller gathers a set of nodes that can be processed in parallel;
        the node replacement controller drains existing workloads from the nodes;
        the node replacement controller creates a replace node request for each node to be processed in parallel;
        the implementation-specific node processor notices the replace node requests and invokes its implementation-specific node replacement logic; and
        application workloads are shifted to the new nodes.

2. The system of claim 1, wherein the node replacement controller is adapted to discover nodes that should be processed, determine when the application workload is in a stable state, declare those nodes as ready to be processed, and determine when those nodes have finished processing.

3. The system of claim 1, wherein the application-specific health controller watches the state of the application workload running within the container orchestration environment, determines if it is in a stable state that can tolerate processing of nodes, and writes that determination or status to an application health status metadata, for use by the node replacement controller.

4. The system of claim 1, wherein the implementation-specific node processor watches metadata for requests to process a node, performs the processing, and writes the state of the processing to metadata, for use by the node replacement controller.

5. The system of claim 1, wherein the nodes are provided within fault domains, wherein the nodes in a fault domain are associated with node labels descriptive of the fault domain, and wherein during replacement of the nodes the container orchestration environment processes the nodes in parallel within each fault domain.

6. A method for providing replacement of nodes in a containerized environment, comprising:
    providing a container orchestration system that provides within one or more container orchestration environments, a runtime for containerized workloads and services; and
    providing a node replacement controller that interacts, through metadata, with an implementation-specific node processor, and application-specific health controller, to drive the process of node replacement within the one or more container orchestration environments, including that the node replacement controller and implementation-specific node processor communicate via metadata types wherein:
        the node replacement controller gathers a set of nodes that can be processed in parallel;
        the node replacement controller drains existing workloads from the nodes;
        the node replacement controller creates a replace node request for each node to be processed in parallel;
        the implementation-specific node processor notices the replace node requests and invokes its implementation-specific node replacement logic; and
        application workloads are shifted to the new nodes.

7. The method of claim 6, wherein the node replacement controller is adapted to discover nodes that should be processed, determine when the application workload is in a stable state, declare those nodes as ready to be processed, and determine when those nodes have finished processing.

8. The method of claim 6, wherein the application-specific health controller watches the state of the application workload running within the container orchestration environment, determines if it is in a stable state that can tolerate processing of nodes, and writes that determination or status to an application health status metadata, for use by the node replacement controller.

9. The method of claim 6, wherein the implementation-specific node processor watches metadata for requests to process a node, performs the processing, and writes the state of the processing to metadata, for use by the node replacement controller.

10. The method of claim 6, wherein the nodes are provided within fault domains, wherein the nodes in a fault domain are associated with node labels descriptive of the fault domain, and wherein during replacement of the nodes the container orchestration environment processes the nodes in parallel within each fault domain.

11. A non-transitory computer readable storage medium having instructions thereon, which when read and executed by a computer including one or more processors cause the computer to perform a method comprising:
   providing a container orchestration system that provides within one or more container orchestration environments, a runtime for containerized workloads and services; and
   providing a node replacement controller that interacts, through metadata, with an implementation-specific node processor, and application-specific health controller, to drive the process of node replacement within the one or more container orchestration environments, including that the node replacement controller and implementation-specific node processor communicate via metadata types wherein:
     the node replacement controller gathers a set of nodes that can be processed in parallel;
     the node replacement controller drains existing workloads from the nodes;
     the node replacement controller creates a replace node request for each node to be processed in parallel;
     the implementation-specific node processor notices the replace node requests and invokes its implementation-specific node replacement logic; and
     application workloads are shifted to the new nodes.

12. The non-transitory computer readable storage medium of claim 11, wherein the node replacement controller is adapted to discover nodes that should be processed, determine when the application workload is in a stable state, declare those nodes as ready to be processed, and determine when those nodes have finished processing.

13. The non-transitory computer readable storage medium of claim 11, wherein the application-specific health controller watches the state of the application workload running within the container orchestration environment, determines if it is in a stable state that can tolerate processing of nodes, and writes that determination or status to an application health status metadata, for use by the node replacement controller.

14. The non-transitory computer readable storage medium of claim 11, wherein the implementation-specific node processor watches metadata for requests to process a node, performs the processing, and writes the state of the processing to metadata, for use by the node replacement controller.

15. The non-transitory computer readable storage medium of claim 11, wherein the nodes are provided within fault domains, wherein the nodes in a fault domain are associated with node labels descriptive of the fault domain, and wherein during replacement of the nodes the container orchestration environment processes the nodes in parallel within each fault domain.

* * * * *